United States Patent [19]
Carey

[11] Patent Number: 6,143,709
[45] Date of Patent: Nov. 7, 2000

[54] WELL CLEANING STIMULATION AND PURGING METHOD

[76] Inventor: Charles C. Carey, P.O. Box 178, Homer, La. 71040

[21] Appl. No.: 09/537,897

[22] Filed: Mar. 28, 2000

[51] Int. Cl.[7] ............................ C11D 17/00; E21B 21/00; B08B 7/00

[52] U.S. Cl. ......................... 510/269; 510/365; 510/426; 510/504; 166/311; 166/312; 134/40

[58] Field of Search ..................................... 510/365, 269, 510/426, 504; 166/311, 312

[56] References Cited

U.S. PATENT DOCUMENTS

| | | | |
|---|---|---|---|
| 5,562,866 | 10/1996 | Hu et al. | 510/432 |
| 5,587,356 | 12/1996 | Dauderman | 510/320 |
| 5,679,877 | 10/1997 | Erilli | 510/218 |
| 5,705,467 | 1/1998 | Choy | 510/370 |
| 5,707,955 | 1/1998 | Gomes | 510/421 |
| 5,728,654 | 3/1998 | Dobson, Jr. | 507/272 |
| 5,767,050 | 6/1998 | Adamy | 510/235 |

*Primary Examiner*—Necholus Ogden
*Attorney, Agent, or Firm*—John M Harrison

[57] ABSTRACT

Well stimulation and purging compositions for enhancing oil and gas production. The compositions include two base solutions which are typically used in combination with each other in well cleanup, well stimulation and formation purging applications. The first base solution is an anionic surfactant characterized by an aqueous solution of ether sulfate, isopropanol anhydrous, ammonium bisulfide, and either potassium chloride or a clay stabilizer formulation. In treatment of oil and gas wells, the solution is capable of reducing surface tension of well fluids and dissipating and dispersing various solids and minerals by dehydrating the well bore and well formation. The composition flocculates and foams the solids, minerals, water and condensate to the well surface. The second base solution is a cationic surfactant characterized by a homogenous aqueous solution of a coco diamine arnido benzyl chloride type quaternary compound, isopropanol anhydrous, ammonium bisulfide, and potassium chloride or a clay stabilizer formulation, which second base solution aids in extracting condensate from wells and dissipates, disperses and retards bacterial growth and buildup of iron sulfide. The first and second base solutions can be applied individually or in combination to the wells in order to clear the water and condensate and significantly enhance total well production by flocculating the water, condensate, solids, bacteria and minerals in the well fluids and foaming these from the well.

8 Claims, No Drawings

WELL CLEANING STIMULATION AND PURGING METHOD

BACKGROUND OF THE INVENTION

1. Field of the Invention

This invention relates to techniques for cleaning, stimulating, purging and unloading fluids from gas and oil wells and more particularly, to well stimulation and purging compositions for enhancing gas and oil production in gas- and condensate-type wells by dissolving solids such as salt, drilling mud, iron sulfide, iron oxide and other minerals and by retarding and dispersing bacteria by flocculating and foaming the solids, minerals, bacteria and fluids from the well. This cleansing action of the composition enhances production by reducing or eliminating hydrostatic back pressure in the wells. The compositions include two base solutions which can be used either alone or in selected combinations with each other, depending on well conditions, in well cleanup, well stimulation or formation purging applications. The first base solution is an anionic surfactant characterized by an aqueous solution of ether sulfate, isopropanol anhydrous, ammonium bisulfide, and either potassium chloride or a clay stabilizer formulation. In batch treatment of oil wells and gas wells, the solution is capable of flocculating water, condensate, bacteria, solids and minerals in the wells, reducing surface tension of well fluids and retarding, dissipating and dispersing the bacteria and various solids and minerals by foaming these to the well surface. This cleansing action substantially clears the well formation, "rat hole" and well bore and enhances total oil and gas production. The solution can also be used to purge water and condensate from the well formation in order to eliminate or reduce water and condensate coning in the well. The solution can be used for continuous injection down the well casing or short string, capillary string or the like tubing to facilitate a 24-hour water and condensate unloading process from the well, as well as dissolving and unloading solids and minerals and removing bacteria from the well. Other selected water-soluble inhibitors such as corrosion, scale, quaternary quats, surfactants and the like can be added to the diluted solution to address other well problems, according to the knowledge of those skilled in the art. The second base solution is a cationic surfactant which is "ambiguous", or can emulsify both water and hydrocarbons in solution, and is characterized by a homogenous solution of a coco diamine amido benzyl chloride type quaternary compound, isopropanol anhydrous, ammonium bisulfide, and potassium chloride or a clay stabilizer formulation for use in extracting condensate from gas or oil wells. The first and second base solutions are applied either individually or typically, in combination with each other, depending on well conditions, to the gas and oil wells in order to substantially clear water, bacteria, solids and iron, salt and other mineral deposits, as well as oil condensate, from the wells and significantly enhance gas and oil production, respectively, from the wells. Under circumstances in which condensate contributes little or no impediment to production, the first base solution can be used alone. Under circumstances in which condensate is a major impediment to production, the second base solution is used alone or typically, in combination with the first base solution, in which case the second base solution is applied to the well typically at a quantity of about 30% by volume of the quantity of first base solution.

In the oil and gas industry, wells which have been operable for many years in the production of oil and gas frequently decrease in productivity due to a number of factors. One of the most common impediments to well productivity is water coning, which occurs when water, frequently in the form of aqueous brines, flows from the well formation and into the well casing annulus in a process called water coning. When a pressure drop is subsequently applied to the well in order to produce the oil to the well surface, the water is extracted from the well in quantities which exceed that of the oil or gas. Consequently, the water must be drawn from the well and separated from the oil or gas, and this increases the cost of oil or gas production from the well. The presence of water coning in the well further impedes oil or gas production by forming salt and other mineral deposits in the well. While a variety of techniques have been used for removing fluids from the well, the salt and other minerals typically remain in the form of deposits which partially or completely block the well, such that deposits of these minerals remain a problem in the production of oil and gas from the well after removal of the water and condensate.

2. Description of the Prior Art

Various compositions having surfactant, emusifyng or cleansing properties are known in the art. Typical of these compositions is the "Formulated Branched Chain Alcohol Ether Sulfate Compounds" described in U.S. Pat. No. 5,562,866, dated Oct. 8, 1996, dated Oct. 8, 1996, to Patrick C. Hu, et al. The compounds are characterized by double-tailed alcohol ether sulfates of specified chemical structures which are formulated with a hydrotrope or a co-surfactant. The formulations are useful for various surfactant utilities including use in hard water systems. A "Thickened, Highly Aqueous, Cost Effective Liquid Detergent Compositions" is detailed in U.S. Pat. No. 5,587,356, dated Dec. 24, 1996, to Shelley L. Dauderman, et al. The compositions are characterized by low-cost, effective aqueous heavy duty liquid laundry detergent compositions. The compositions contain relatively low levels of an anionic/nonionic-based surfactant system with a protease-containing enzyme component, a low-cost viscosity-enhancing agent and relatively large amounts of water. The anionic component of the surfactant system includes a combination of alkyl sulfate and alkyl ether sulfate. The nonionic component of the surfactant system includes fatty alcohol ethoxylates. U.S. Pat. No. 5,679,877, dated Oct. 21, 1997, to Rita Erilli, et al., discloses a "Thickened Liquid Cleaning Composition Containing an Abrasive". The composition includes a paraffin sulfonate, an ethoxylated alkyl ether sulfate, and optionally, a zwitterionic betaine suriactant, a Laponite day thickener and water. U.S. Pat. No. 5,705,467, dated Jan. 6, 1998, to Clement K. Choy, describes "Thickened Aqueous Cleaning Compositions and Methods of Use", characterized by a thickening agent including an alkyl ether sulfate surfactant which forms about 0.1 to about 10% by weight of the composition, about 0.1–5.0% by weight of a cothickening surfactant including an alkali metal fatty acid sulfate and/or an alkoxylated alkylphenol sulfate salt, a solvent selected from the class consisting of terpene derivatives including a functional group and tertiary alcohols which form about 0.01 to about 10% by weight of the composition, and an electrolyte component in an amount effective for enhancing thickening effects of the alkyl ether sulfate surfactant and solvent. A "High Foaming Nonionic Surfactant Based Liquid Detergent" is disclosed in U.S. Pat. No. 5,707,955, dated Jan. 13, 1998, to Gilbert S. Gomes, et al. The detergent is characterized by a disenfecting agent, four essential surfactants including a water-soluble nonionic surfactant, an ethoxylated alkyl ether sulfate anionic surfactant, two sulfonate surfactants, and water. U.S. Pat. No. 5,728,654, dated Mar.

17, 1998, to James W. Dobson, Jr., et al., discloses "Stabilized Fluids Containing Soluble Zinc", characterized by low solids, high density fluids which are useful as drilling, workover, and completion fluids and the like in oil and gas well operations. The fluids include a brine having dissolved therein a zinc salt such as zinc bromide, and optionally one or more additional water soluble salts, a viscosifier which is a high surface area silica, a biopolymer viscosifier, a fluid loss control additive which is preferably a starch derivative, zinc carbonate, and optionally, an alkaline buffer, a polar additive and a bridging agent. U.S. Pat. No. 5,767,050, dated Jun. 16, 1998, to Steven Adamy, details "Light Duty Liquid Cleansing Compositions Comprising Partially Esterified Polyhydric Alcohol Solubilizing Agent". The compositions include a biodegradable solubilizing agent, a water soluble, foaming, ethoxylated alkyl ether sulfate anionic surfictant, and optionally, a nonionic surfactant and a water soluble, foaming zwitterionic betaine surfactant.

An object of this invention is to provide well stimulation and purging/squeezing compositions for enhancing gas or oil production in gas and condensate type wells.

Another object of this invention is to provide well stimulation and purging compositions which are capable of batch treatment or continuous injection of oil and gas wells to facilitate removal of fluids, bacteria and various solids, salt and other mineral deposits from the wells, or purging of fluids from the well formations in order to reduce or eliminate fluid coning in the wells.

Still another object of this invention is to provide a well stimulation and purging composition characterized by an anionic surfactant which is an aqueous solution of ether sulfate, isopropanol anhydrous, ammonium bisulfide, and potassium chloride or a clay stabilizer formulation, and the solution is capable of batch application to oil and gas wells for the flocculating and foaming of water, condensate, bacteria and dissolved solids, salt and other minerals to the well surface in order to substantially unblock the well, and which solution can be used in the purging of water from the formation outside the well casing in order to eliminate or reduce water coning in the well. The solution can be used to facilitate continuous unloading of water, condensate, bacteria and dissolved solids, iron, salt and other minerals from the well.

Yet another object of this invention is to provide a well stimulating and purging composition characterized by a cationic, soluble surfactant foamer which is "ambiguous", or capable of emulsifying both oil and water, in well fluids, and is characterized by a homogenous solution of a coco diamine amido benzyl chloride type quaternary compound, isopropanol anhydrous, ammonium bisulfide, and potassium chloride or a clay stabilizer formulation, which composition is used primarily for extracting condensate from oil and gas wells.

A still further object of this invention is to provide a method of enhancing oil and gas production by cleaning, stimulating or purging oil and gas wells.

SUMMARY OF THE INVENTION

These and other objects of the invention are provided in well stimulation and purging compositions for enhancing oil or gas production. The compositions include two base solutions which can be used either alone or in combination with selected additives or each other in well cleanup, well stimulation or formation purging applications. The first base solution is an anionic surfactant characterized by an aqueous solution of ether sulfate, isopropanol anhydrous, ammonium bisulfide, and either potassium chloride or a clay stabilizer formulation. In batch treatment of oil or gas wells, the solution is capable of flocculating and foaming water, condensate, dissolved salt and other minerals and solids to the well surface in order to substantially clear the well for oil or gas production by reducing or eliminating hydrostatic back pressure in the well. The solution can also be used in purging of water from the formation outside the well casing to eliminate or reduce water coning in the well. The composition can be used for continuous injection of the oil or gas well in order to facilitate 24-hour fluid, condensate and mineral unloading from the well. Selected water-soluble additives can be added to the diluted composition to address other well problems. In cases of extreme calcium and other mineral blockage, the solution can be formulated with sulfarnic acid and applied to the well. The second base solution, a soluble cationic surfactant which is "ambiguous", or capable of emulsifying both oil and water in well fluids, is characterized by a substantially homogenous aqueous solution of a coco diamine amido benzyl chloride type quaternary compound, isopropanol anhydrous, potassium chloride, ammonium bisulfide, and potassium chloride or clay stabilizer formulation, and is used primarily for extracting condensate from gas and oil wells. Depending on well conditions, the first base solution and the second base solution are typically applied to the well in combination with each other in order to substantially eliminate water and bacteria, solids, salt and other mineral deposits, as well as condensate, from the well and substantially enhance oil or gas production from the well by decreasing hydrostatic back pressure in the well. Under circumstances in which condensate contributes little or no impediment to production, the first base solution can be used in combination with small quantities of the second base solution. Under circumstances in which condensate is a major impediment to production, the second base solution is used in larger quantities in combination with the first base solution. Typically, the second base solution is applied to the well in combination with the first base solution, in which case the second base solution is generally applied to the well at a quantity of about 30% by volume of the quantity of first base solution.

DESCRIPTION OF THE PREFERRED EMBODIMENTS

In a preferred embodiment, the well purging and stimulating compositions of this invention include two base solutions which are typically used in combination with each other in order to facilitate cleaning of gas and oil wells through the cleaning and hydration of the hydrocarbon formation, "rat hole" and well bore in well cleanup, well stimulation and formation purging applications in gas and oil wells. The first base solution is an anionic surfactant characterized by an aqueous solution of ether sulfate, isopropanol anhydrous, ammonium bisulfide and either potassium chloride or a clay stabilizer formulation. A small quantity of TADCO (trademark) ALPHA BLUE trademark) or the like dye can be added to the solution to facilitate visual monitoring of solution levels in pump trucks during application. In batch treatment of oil and gas wells, the solution is capable of flocculating and foaming water, condensate, bacteria, dissolved salt and other minerals and solids to the well surface in order to substantially clear the well for oil or gas production. The solution can also be used to purge water from the hydrocarbon formation outside the well casing in order to eliminate or at least reduce water coning in the well. Batch treatment of the oil and gas wells using the compositions substantially eliminates hydrostatic pressure in the wells which normally retards or inhibits oil or gas production The first and second base solutions are typically used in selected ratios to address the oil and water ratios in batch treatment. For example, under circumstances in which condensate contributes little or no impediment to production, and the impediment is due mainly to water coning and mineral and solids blockage, the first base solution is used typically with smaller quantities of the second base solution. Under circumstances in which condensate, in combination with solids and mineral deposits, hinders production, the first base solution is used typically in combination with larger quantities of the second base solution. Generally, the second base solution is applied to the well at a quantity of about 30% by volume of the quantity of first base solution. The first base solution and second base solution can be continually injected either individually or typically, in combination with each other into the oil or gas wells down the well casing, capillary strings, short strings or chemical injector sleeves (packer or tubing), to facilitate 24-hour unloading of water, condensate and minerals from the well. A selected additive such as a water-soluble inhibitor, in non-exclusive particular, can be added to the solutions to address other well production problems, according to the knowledge of those skilled in the art. In cases of extreme well blockage due to calcium and other solidified mineral deposits, about 100 lbs. of sulfarnic acid per about 10 barrels of purge treatment with about 48 hours of soaking time is typically required for clearing the well.

The ether sulfate of the first base solution functions as a surfactant and foaming agent which facilitates flocculating and foaming of the condensate, water, bacteria and dissolved salt and other types of solids and minerals from the "rathole", or bottom of the well, to the well surface. The isopropanol anhydrous (IPA) is a polar solvent which holds the other composition components in aqueous solution. The potassium chloride or clay stabilizer formulation prevents clay deposits in the well formation from swelling and blocking the well as the water, condensate, bacteria, minerals, solids and salt are flocculated and foamed from the well. The ammonium bisulfide functions as an oxygen scavenger which prevents precipitation of iron in the typically high-chloride water in the well, such that the iron remains in solution and is foamed from the well with the other solids and minerals.

The first base solution of the well stimulation and purging compositions is typically prepared in 300-gallon batches by initially placing about 1794 lbs. of water in a mixing vat and heating the water to about 40° C. As the heated water is circulated in the vat, about 439 lbs. ether sulfate [R(OCH$_2$CH$_2$)$_x$OSO$_3$M], about 36 lbs. isopropanol anhydrous (IPA) [(CH$_3$)$_2$CHOH], about 39 lbs. potassium chloride (KCl) and about 90 lbs. ammonium bisulfide (HSNS) are added to the water, and the mixture is circulated in the vat for about 30 minutes to achieve a substantially homogenous solution. In another embodiment about a quart of any suitable selected liquid clay stabilizer formulation well-known to those skilled in the art can be mixed instead of the potassium chloride in the solution. About 5 oz. of ALPHA (trademark) blue dye is typically added to the solution for visual monitoring of the solution during application The solution is typically stored in multiple 55-gallon drums or in 300 gallon POLY-CORR (trademark) tanks. In continuous injection applications, the first base solution and second base solution are applied individually or in combination with each other to the well continuously over a 24-hour period, and either solution can diluted with water depending on well conditions, such as in the treatment of wells with high salt content. Any suitable water-soluble corrosion inhibitor can be added to the continuous injection solution at a concentration of about 6 gallons of corrosion inhibitor per 94 gallons of the diluted first base solution, in order to enhance corrosion resistance of the well.

The second base solution is a cationic surfactant characterized by a homogenous solution of coco diamine amido benzyl chloride type quaternary compound, isopropanol anhydrous, potassium chloride and ammonium bisulfide. A small quantity of TADCO (tradenark) Alpha Blue or the like dye can be added to the solution to facilitate visual monitoring of solution levels in pump trucks during application. The coco diamine amido benzyl chloride type quaternary compound, such as that having chemical formula $C_{12}H_{25}^+$ $(CH_3)_3Cl^-$ and obtained from Select Industries, Inc., of Wichita Falls, Tex., is an oil emulsifier, surfactant and foaming agent, and the second base solution is capable of emulsifying both hydrocarbons and water in solution. The first base solution and the second base solution are typically applied in combination with each other in selected ratios depending on the oil and condensate ratio in the wells, to address water and condensate coning and salt, solid, mineral deposit and bacteria unloading from the well, with higher quantities of the second base solution used in cases of production hindrance due predominately to condensate. The second base solution is typically prepared in 300-gallon batches, by initially placing about 1936 lbs. of water in a mixing vat and heating the water to about 40° C. As the water is circulated in the vat, about 352 lbs. of the coco diamnine amido benzyl chloride type quaternaly compound [$C_{12}H_{25}^+(CH_3)_3Cl^-$], about 72 lbs. isopropanol anhydrous [(CH$_3$)$_2$CHOH], about 39 lbs. of potassium chloride (KCl) and about 90 lbs. of ammonium bisulfide (HSNS) is added to the heated water. In another embodiment about a quart of a selected liquid clay stabilizer formulation well-known to those skilled in the art can be mixed instead of the potassium chloride in the solution, as described above with respect to the first base solution. The heated mixture is circulated for about 30 minutes to achieve a substantially homogenous solution, which is typically stored in multiple 55-gallon drums or in 300 gallon POLY-CORR (trademark) tanks.

The well stimulation and purging compositions of this invention can be used in batch treatment of gas and oil wells in order to remove water, condensate and dissolved salt, solids and mineral deposits from the well and retard growth of bacteria in the well, thereby significantly enhancing gas or oil production from the wells. Accordingly, depending on water/condensate ratios in the well the first base solution and the second base solution are typically applied to the well in succession, or alternatively, the solutions are mixed at the well site and then applied to the well. For example, under circumstances in which condensate is at least a partial impediment to production, the second base solution is applied to the well in combination with the first base solution. The first base solution flocculates or emulsifies and foams the water, solids and mineral deposits, and the second base solution emulsifies and foams the condensate and retards further growth of bacteria in the well and disperses the existing bacteria to the well surface. Under circumstances in which batching of the solutions is inadequate for clearing the well minerals and condensate from the oil or gas well, continuous injection of the solutions into the well can be used for the purpose. In a third application the composition can be used to purge water, condensate, dissolved salts and minerals and remove solids to eliminate or substantially reduce water and condensate coning in the well. Accordingly, in purging applications the well is typically initially preflushed with about 15 barrels of flush water, followed by application of the composition, which can be slipstreamed, spearheaded or padded in conjunction with the flush water. The flush water is typically characterized by an aqueous solution of 2% potassium chloride and 0.05% clay stabilizer. Alternatively, the flush water can be made using 1 quart of a selected liquid clay stabilizer formulation per about 7 barrels of aqueous solution.

In typical batch treatment of packerless completion gas and oil wells, both the first base solution and the second base solution are typically applied in succession to the well, depending on well conditions. About 25 gallons of the first base solution is initially applied from a pump truck directly into the casing annulus. Under circumstances in which a packer is interposed between the well casing and tubing string of the well, the solution is applied to the annulus through the tubing string. Depending on well conditions several, typically 5–15, gallons of the second base solution are then in like manner applied from a separate holding tank into the annulus or tubing string, respectively. After delivery of the composition solutions into the well, the master valve or wing valve of the well is repeatedly opened and closed or "rocked". This action induces rapid pressure changes in the well which cause the first base solution of the composition to mix and foam with the water, solids and minerals, and the second base solution to mix and foam with the hydrocarbons in the well. Additional composition is added to the well and the agitation process is repeated, as required until the well fluid foams upwardly through the casing annulus in the case of packerless completion wells, or through the tubing string in packered completion wells. The water, iron, minerals, solids and salt in the casing, in addition to the oil condensate, are foamed to the well surface with the composition and the effluent is typically collected in a suitable collection facility. The various hydrocarbons are separated from the water and composition by means of conventional separation techniques. Accordingly, the well annulus and "rathole" are substantially cleared of condensate and water and iron, solids and salt and other mineral deposits, and this cleansing action significantly enhances gas or oil production from the well by reducing or eliminating hydrostatic back pressure in the well. In an alternative batch treatment various ratios of the first base solution and second base solution, depending on well condensate/water ratios, can be mixed in a pump truck at the well site and applied to the well as a mixture, and the mixture is agitated in the well by "rocking" the master valve or wing valve of the well as described above. The water, solids, mineral deposits and oil condensate are mixed and foamed together with the composition to the well surface and collected in collection tanks.

In typical continuous injection of packerless completion gas and oil wells, the first base solution is continuously injected from a holding tank directly into the well casing annulus, typically at a rate of about 4–8 gallons of solution per day, depending on well production. The second base solution is typically "slip-streamed" from a separate tank into the injection line of the continuous injection solution, also typically at a rate of about 4–8 gallons of solution per day. In packered completion gas and oil wells, the solutions are delivered to the casing annulus through a conventional tubing or packer injector sleeve or coiled tubing or capillary tubing which extends downwardly toward the perforations. The injected composition solutions mix and flocculate and foam with the water and mineral deposits and oil condensate in the well. The resulting effluent is produced to the well surface through either the capillary or coiled tubing or casing and collected in a suitable collection facility, and the hydrocarbons are separated from the effluent. Injection of the solutions is continued until gas or oil production from the well stabilizes, and then the volume of injected solutions is reduced accordingly until maxima gas or oil flow is achieved.

In typical purging application of the composition, the gas or oil well is initially preflushed with about 15 barrels of the flush water, which is applied to the well either directly into the casing annulus in the case of packerless completion wells, or through the tubing in the case of packered completion wells. Depending on well conditions, typically about 25 gallons of the first base solution and several (typically 5–15) gallons of the second base solution are then in like manner applied to the casing annulus or tubing by slipstreaming, spearheading or padding in conjunction with the flush water. A larger or smaller volume of the first base solution and second base solution can be used, as needed, depending on the degree of mineral or solid blockage or condensate hindrance to production. The well is typically "shut-in" for approximately 24–48 hours in an attempt to achieve normal well shut-in pressures. Then, if needed, the well is "rocked" by repeatedly opening and closing the master valve or the wing valve of the well as heretofore described, to cause the composition solutions to foam and mix with the water in the annulus and "rathole" and in the hydrocarbon formation, as well as with the solids, minerals and condensate in the water. The flocculating and foaming composition mixture draws the formation water, solids and minerals, as well as the oil condensate, from the formation through the hydrocarbon perforations in the casing, and foams upwardly through the casing annulus or tubing to the well surface, where the effluent is collected. Accordingly, the formation and casing annulus are substantially freed of water, solid and mineral blockage and condensate, thus reducing or eliminating hydrostatic back pressures to free gas flow and substantially preventing or reducing water coning in the casing annulus during subsequent production from the well. In cases of extreme blockage of the well bore due to calcium or other mineral deposits, sulfamic acid is typically "slip-streamed" into the well with the flush water at a rate of about 100 lbs. of sulfamic acid per 10 barrels of flush water. The entire sulinic acid, flush water and composition mixture is allowed to soak in the well typically for about 48 hours in the well before "rocking" of the well, as described above.

The invention will be better understood by consideration of the following examples:

EXAMPLE 1

A 300 gallon batch of the first base solution was prepared by initially placing into a blending vat about 1794 lbs. of tap water, and the water was circulated in the vat and heated to about 40° C. To the water was added about 439 lbs. of ether sulfate, about 36 lbs. of isopropanol anhydrous (IPA), about 39 lbs. of potassium chloride, about 90 lbs. of ammonium bisulfide and about 5 oz. of TADCO (trademark) Alpha Blue dye, respectively. The heated water was circulated in the vat for about 30 minutes to achieve a substantially homogenous first base solution, and the first base solution was removed from the vat and stored in multiple 55-gallon drums.

EXAMPLE 2

A 300 gallon batch of the first base solution was prepared by initially placing into a blending vat about 1794 lbs. of tap water, and the water was circulated in the vat and heated to about 40° C. To the water was added about 439 lbs. of ether sulfate, about 36 lbs. of isopropanol anhydrous (IPA), about a quart of liquid clay stabilizer formulation, about 90 lbs. of ammonium bisulfide and about 5 oz. of TADCO (trademark) Alpha Blue dye, respectively. The heated water was circulated in the vat for about 30 minutes to achieve a substantially homogenous first base solution, and the first base solution was removed from the vat and stored in multiple 55-gallon drums.

EXAMPLE 3

A 300 gallon batch of the second base solution was prepared by initially placing into a blending vat about 1936 lbs. of tap water, and the water was circulated in the vat and heated to about 40° C. To the water was added about 352 lbs. of a coco diamine amido benzyl chloride type quaternary compound $[C_{12}H_{25}{}^{+}(CH_3)_3Cl^{-}]$, purchased from Select Industries, Inc., of Wichita Falls, Tex.; about 72 lbs. of isopropanol anhydrous (IPA); about 39 lbs. of potassium chloride; about 90 lbs. of ammonium bisulfide; and about 5 oz. of TADCO (trademark) Alpha Blue dye, respectively. The heated water was circulated in the vat for about 30 minutes to achieve a substantially homogenous second base solution, and the second base solution was removed from the vat and stored in multiple 55-gallon drums.

EXAMPLE 4

A 300 gallon batch of the second base solution was prepared by initially placing into a blending vat about 1936 lbs. of tap water, and the water was circulated in the vat and heated to about 40° C. To the water was added about 352 lbs. of a coco diamine amido benzyl chloride type quaternary compound $[C_{12}H_{25}{}^{+}(CH_3)_3Cl^{-}]$, purchased from Select Industries, Inc., of Wichita Falls, Tex.; about 72 lbs. of isopropanol anhydrous (IPA); about a quart of liquid clay stabilizer formulation; about 90 lbs. of ammonium bisulfide; and about 5 oz. of TADCO (trademark) Alpha Blue dye, respectively. The heated water was circulated in the vat for about 30 minutes to achieve a substantially homogenous second base solution, and the second base solution was removed from the vat and stored in multiple 55-gallon drums.

EXAMPLE 5

About 7 barrels of flush water was prepared by initially placing about 7 barrels (294 gallons) of tap water in a mixing vat. About 1 quart of liquid clay stabilizer formulation was added to the water and mixed in the vat for about 30 minutes to achieve a substantially homogenous solution. The flush water was removed from the mixing vat and stored in multiple 55-gallon drums.

EXAMPLE 6

About 7 barrels (294 gallons) of flush water was prepared by initially placing about 7 barrels (294 gallons) of tap water to a mixing vat. A sufficient quantity of potassium chloride and clay stabilizer was added to the tap water to achieve a concentration of about 2% potassium chloride and about 0.05% clay stabilizer, and the water was mixed in the vat for about 30 minutes to achieve a substantially homogenous flush water solution. The flush water was removed from the mixing vat and stored in multiple 55-gallon drums.

EXAMPLE 7

Batch Treatment

About 25 gallons of the first base solution was injected from a pump truck into the casing annulus of a packerless completion gas well, gas production from which well was hindered by water, iron, solids and salt deposits and oil condensate in the casing. About 10 gallons of the second base solution was then injected from a separate pump truck into the casing annulus of the well, and the master valve of the well was repeatedly opened and closed for about 20 minutes. The first base solution was agitated and formed a foaming mixture with the water, iron and salt in the well, and the second base solution formed a foaming mixture with the oil condensate in the well. The composition solutions foamed the water, iron, salt and oil condensate upwardly through the casing annulus, where the flocculating and foaming effluent was collected in collection tanks. The extracted hydrocarbons (water and oil) were separated by means of conventional separation techniques. Production from the well was considerably enhanced.

EXAMPLE 8

Batch Treatment

About 25 gallons of the first base solution was injected from a pump truck into tubing extending through the casing of a packered completion well, gas production from which well was hindered primarily by water and iron and salt deposits in the well. About 5–10 gallons of the second base solution was then injected from a separate tank on the pump truck into the tubing to reach the casing annulus of the well, and the master valve of the well was repeatedly opened and closed for about 20 minutes. As the composition solutions were thusly agitated in the well, the first base solution formed a foaming mixture with the water, iron and salt in the well, and the second base solution formed a foaming mixture with the oil condensate in the well. The composition solutions flocculated and foamed the water, iron, salt and oil condensate upwardly through the casing annulus, where the foaming effluent was collected in collection tanks. The extracted hydrocarbons (water and oil) were separated by means of conventional separation techniques. Production from the well was considerably enhanced.

EXAMPLE 9

Continuous Injection Treatment

From a 300 gallon POLY-CORR (trademark) tank, the first base solution was continuously injected at a rate of about 4–6 gallons per day into the casing annulus of a packerless completion oil well, oil production from which was hindered primarily by water and iron and salt deposits in the casing. The first base solution mixed and foamed with the water, iron and salt in the well casing, and the foaming effluent was continually produced with the oil from the well. The extracted hydrocarbons were separated from the water and dissolved iron and salt minerals by means of conventional separation techniques. Continuous injection of the first base solution into the well was continued until production from the well stabilized, at which point the quantity of injected first base solution was adjusted to enhance stable production.

EXAMPLE 10

Continuous Injection Treatment

From a 300 gallon POLY-CORR (trademark) tank, the first base solution was continually injected at a rate of about 4–6 gallons per day into spaghetti string tubing extending through the coiled tubing of a packered completion gas well, and the second base solution was continually "slip-streamed" from a separate holding tank at a rate of about 4–6 gallons per day. Gas production from the well had been hindered by water and iron and salt deposits, as well as oil condensate, in the well. The composition solution mixed and foamed with the water, iron, salt and oil condensate in the well casing, and the foaming effluent was continually produced with the gas from the well. The extracted hydrocarbons (water and oil) were separated by means of conventional separation techniques. Continuous injection of the first and second base solutions into the well was continued until production from the well stabilized, at which point the quantities of the solutions were adjusted as needed to enhance stable production.

EXAMPLE 11

Continuous Injection Treatment

From a 300 gallon POLY-CORR (trademark) tank, the first base solution with corrosion inhibitor was continuously injected at a rate of about 4–6 gallons per day into the casing annulus of a packerless completion well, production from which had been hindered primarily by water and iron and salt deposits in the casing. The first base solution with inhibitor mixed and foamed with the water, iron and salt in the well casing, and the foaming effluent was continually produced with the well production. Continuous injection of the first base solution into the well was continued until production from the well stabilized, at which point injection of the first base solution with corrosion inhibitor into the well was gradually adjusted in quantity as needed to enhance stable production. The corrosion inhibitor in the first base solution enhanced well resistance to corrosion.

EXAMPLE 12

Purge Treatment

The composition solutions were used to purge formation water from a gas well in order to eliminate water and condensate coning in the well. Accordingly, the gas well was initially preflushed with about 15 barrels of the flush water, which was applied to the well directly into the casing annulus of the packerless completion well. About 15–25 gallons of the first base solution was in like manner applied to the casing annulus, followed by a 4 gallon "pad" of the flush water. Several gallons of the second base solution were next applied to the casing annulus, which was finally overflushed with about 30 gallons of the flush water. The well was then "rocked" by repeatedly opening and closing the master valve of the well, and this caused the composition solutions to foam and mix with the water in the annulus and in the hydrocarbon formation, as well as with the salt, iron and oil condensate in the water. The flocculating and foaming composition drew the formation water from the formation through the hydrocarbon perforations in the casing, and the effluent foamed upwardly through the casing annulus to the well surface, where the effluent was collected in tanks. Accordingly, the hydrocarbon formation and casing annulus were substantially freed of fluids, thereby eliminating fluid coning in the casing annulus during production from the well.

EXAMPLE 13

Purge Treatment (sulfamic acid)

The composition solutions were used to purge formation fluids from a gas well in order to eliminate water and condensate coning in the well, and to remove a large quantity of calcium and other mineral deposits from the well. Accordingly, the gas well was initially preflushed with about 15 barrels of the flush water, which was applied to the well directly into the casing annulus of the packerless completion well. About 150 lbs. of sulfamic acid was "slip-streamed" into the casing annulus with the flush water. About 15 gallons of the first base solution was "slip-streamed" into the casing annulus. About 5–15 gallons of the second base solution, depending on well conditions, was next applied to the casing annulus, which was finally "slip-streamed" into the flush water. The master valve of the well was closed for about 48 hours to allow the liquid mixture to soak in the well. The well was then "rocked" by repeatedly opening and closing the master valve of the well, and this caused the composition solutions to foam and mix with the water in the annulus and in the hydrocarbon formation, as well as with the salt, iron and oil condensate in the water. The flocculating and foaming composition drew the formation water from the formation through the hydrocarbon perforations in the casing, and the effluent foamed upwardly through the casing annulus to the well surface, where the effluent was collected in tanks. Accordingly, the hydrocarbon formation and casing annulus were substantially freed of water, thereby eliminating fluid coning in the casing annulus during production from the well, and the calcium and mineral deposits in the well bore were dissolved. Production was considerably enhanced.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A method of cleaning, purging and stimulating an oil or gas well having a well bore and a valve for selectively opening and closing said well bore, said method comprising:

(a) providing a first base solution comprising water and a selected quantity of ether sulfate dissolved in said water; a selected quantity of isopropanol anhydrous dissolved in said water; a selected quantity of clay stabilizer selected from the group consisting of potassium chloride and clay stabilizer formulation dissolved in said water; and a selected quantity of ammonium bisulfide dissolved in said water;

(b) providing a second base solution comprising water and a selected quantity of coco dianine amido benzyl chloride type quaternary compound dissolved in said water; a selected quantity of isopropanol anhydrous dissolved in said water; a selected quantity of clay stabilizer selected from the group consisting of potassium chloride and clay stabilizer formulation dissolved in said water; and a selected qantity of ammonium bisulfide dissolved in said water;

(c) applying a selected quantity of said first base solution to the well bore;

(d) applying a selected quantity of said second base solution to the well bore;

(e) causing said first base solution and said second base solution to form a foaming effluent in the well bore by repeatedly opening and closing the valve of the well; and (f) collecting said effluent from the well bore.

2. The method of claim 1 wherein said applying a selected quantity of said first base solution to the well bore comprises batching a selected quantity of said first base solution into the well bore and said applying a selected quantity of said second base solution to the well bore comprises batching a selected quantity of said second base solution into the well bore.

3. The method of claim 1 comprising providing flush water including water and a selected quantity of clay stabilizing agent selected from the group consisting of potassium chloride and clay stabilizer formulation dissolved in said water and preflushing the well bore with said flush water before said applying a selected quantity of said first base solution to the well bore.

4. The method of claim 3 comprising applying a "pad" of said flush water to the well bore with a selected quantity of said flush water before applying said selected quantity of said second base solution to the well bore.

5. The method of claim 4 wherein said applying a selected quantity of said first base solution to the well bore comprises batching a selected quantity of said first base solution into the well bore and said applying a selected quantity of said second base solution to the well bore comprises batching a selected quantity of said second base solution into the well bore.

6. The method of claim 1 comprising providing flush water including water and a selected quantity of clay stabilizing agent selected from the group consisting of potassium chloride and clay stabilizer formulation dissolved in said water; preflushing said well bore with a selected quantity of said flush water before said applying a selected quantity of said first base solution to the well bore; applying a selected quantity of sulfamic acid to the well bore with said selected quantity of said first base solution; applying a "pad" of said flush water to said well bore alter said applying a selected quantity of said first base solution to the well bore and before said applying a selected quantity of said second base solution to the well bore; and overflushing the well bore with a selected quantity of said flush water after said applying a selected quantity of said second base solution to the well bore.

7. The method of claim 6 wherein said applying a selected quantity of said first base solution to the well bore comprises batching a selected quantity of said first base solution into the well bore and said applying a selected quantity of said second base solution to the well bore comprises batching a selected quantity of said second base solution in to the well bore.

8. A method of cleaning, purging and stimulating an oil or gas well having a well bore, said method comprising:

(a) providing a first base solution comprising water and a selected quantity of ether sulfate dissolved in said water; a selected quantity of isopropanol anhydrous dissolved in said water; a selected quantity of clay stabilizer selected from the group consisting of potassium chloride and clay stabilizer formulation dissolved in said water; and a selected quantity of ammonium bisulfide dissolved in said water;

(b) providing a second base solution comprising water and a selected quantity of coco diamine amido benzyl chloride type quaternary compound dissolved in said water; a selected quantity of isopropanol anhydrous dissolved in said water; a selected quantity of clay stabilizer selected from the group consisting of potassium chloride and clay stabilizer formulation dissolved in said water; and a selected qantity of ammonium bisulfide dissolved in said water;

(c) continuously injecting a selected quantity of said first base solution into the well bore;

(d) "slip-streaming" a selected quantity of said second base solution into the well bore, whereby said first base solution and said second base solution mix to form a foaming effluent in the well bore; and (e) collecting said effluent from the well bore.

* * * * *